United States Patent
Song et al.

(10) Patent No.: US 12,425,165 B2
(45) Date of Patent: Sep. 23, 2025

(54) TRANSMISSION METHOD AND APPARATUS FOR PHASE TRACKING REFERENCE SIGNAL

(71) Applicant: FUJITSU LIMITED, Kawasaki (JP)

(72) Inventors: Lei Song, Beijing (CN); Zhe Chen, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 489 days.

(21) Appl. No.: 17/702,961

(22) Filed: Mar. 24, 2022

(65) Prior Publication Data

US 2022/0216973 A1    Jul. 7, 2022

Related U.S. Application Data

(63) Continuation of application No. PCT/CN2019/109151, filed on Sep. 29, 2019.

(51) Int. Cl.
*H04L 5/00*    (2006.01)

(52) U.S. Cl.
CPC .................. *H04L 5/0053* (2013.01)

(58) Field of Classification Search
CPC ..... H04L 5/0053; H04L 5/005; H04L 5/0051; H04L 5/0094; H04L 1/08; Y02D 30/70; H04B 7/0617; H04W 72/23
See application file for complete search history.

(56) References Cited

U.S. PATENT DOCUMENTS

| | | | |
|---|---|---|---|
| 11,083,001 B2* | 8/2021 | Choi | H04L 1/0009 |
| 2013/0336195 A1* | 12/2013 | Seo | H04L 5/0048 370/315 |
| 2019/0052344 A1 | 2/2019 | Kundargi et al. | |
| 2019/0158171 A1 | 5/2019 | Ren et al. | |
| 2019/0296876 A1* | 9/2019 | Zhang | H04L 5/0048 |
| 2019/0297620 A1* | 9/2019 | Tian | H04W 28/0205 |

(Continued)

FOREIGN PATENT DOCUMENTS

| | | |
|---|---|---|
| CN | 101567774 A | 10/2009 |
| CN | 108039903 A | 5/2018 |

(Continued)

OTHER PUBLICATIONS

Notice of Reasons for Refusal issued by the Japan Patent Office for corresponding Japanese Patent Application No. 2022-519074, mailed on Feb. 21, 2023, with an English translation.

(Continued)

*Primary Examiner* — Andrew C Oh
(74) *Attorney, Agent, or Firm* — Myers Wolin, LLC

(57) ABSTRACT

A transmission method and apparatus for a phase tracking reference signal. The apparatus is applicable at a terminal equipment side and includes: a first receiving unit configured to receive configuration information or indication information transmitted by a network device, the configuration information or indication information being used for indicating that a terminal equipment receives at least two versions of a transport block in a scheduling unit; and a first determining unit configured to determine an association relationship between a PTRS antenna port and a DMRS antenna port according to the configuration information, the indication information or a predefined rule.

19 Claims, 7 Drawing Sheets

(56) References Cited

U.S. PATENT DOCUMENTS

| | | | |
|---|---|---|---|
| 2020/0008102 A1 | 1/2020 | Yokomakura et al. | |
| 2020/0052950 A1* | 2/2020 | Manolakos | H04L 5/0048 |
| 2020/0053778 A1* | 2/2020 | Babaei | H04W 48/12 |
| 2020/0106559 A1* | 4/2020 | Vilaipornsawai | H04L 1/1896 |
| 2020/0106584 A1 | 4/2020 | Jiang et al. | |
| 2020/0107353 A1* | 4/2020 | Jung | H04L 1/1854 |
| 2020/0244320 A1 | 7/2020 | Wang et al. | |
| 2020/0359270 A1 | 11/2020 | Zhang | |
| 2021/0044400 A1 | 2/2021 | Jiang et al. | |
| 2021/0075570 A1 | 3/2021 | Xi et al. | |
| 2021/0091902 A1 | 3/2021 | Yamada et al. | |
| 2022/0166570 A1* | 5/2022 | Hu | H04L 5/0092 |
| 2022/0217729 A1* | 7/2022 | Kim | H04W 72/1263 |
| 2022/0256566 A1* | 8/2022 | Gao | H04W 72/1263 |

FOREIGN PATENT DOCUMENTS

| | | | |
|---|---|---|---|
| CN | 108111283 A | 6/2018 | |
| CN | 108631990 A | 10/2018 | |
| CN | 109150429 A | 1/2019 | |
| CN | 109194453 A | 1/2019 | |
| CN | 109586868 A | 4/2019 | |
| CN | 110034904 A | 7/2019 | |
| CN | 110120860 A | 8/2019 | |
| EP | 3 512 147 A1 | 7/2019 | |
| EP | 3 579 638 A1 | 12/2019 | |
| WO | 2018/143405 A1 | 8/2018 | |
| WO | WO-2018182242 A2 * | 10/2018 | H04B 1/10 |
| WO | 2019/095701 A1 | 5/2019 | |
| WO | WO-2019093865 A1 * | 5/2019 | H04L 5/0048 |
| WO | 2019/130810 A1 | 7/2019 | |
| WO | WO-2021002011 A1 * | 1/2021 | H04L 1/08 |
| WO | WO-2021028045 A1 * | 2/2021 | H04J 13/0003 |

OTHER PUBLICATIONS

OPPO, "Enhancements on multi-TRP and multi-panel transmission", Agenda Item: 7.2.8.2, 3GPP TSG-RAN WG1 Meeting #98, R1-1908351, Prague, CZ, Aug. 26-30, 2019.

ZTE, "Enhancements on Multi-TRP and Multi-panel Transmission", Agenda Item: 7.2.8.2, 3GPP TSG-RAN WG1 Meeting #98, R1-1908191, Prague, CZ, Aug. 26-30, 2019.

Vivo, "Remaining issues on PT-RS", Agenda Item: 7.1.2.3.4, 3GPP TSG-RAN WG1 Meeting #92bis, R1-1803824, Sanya, China, Apr. 16-20, 2018.

First Notification of Office Action and Search Report issued by the China National Intellectual Property Administration for corresponding Chinese Patent Application No. 201980100761.5, mailed on Jun. 8, 2023, with an English translation.

First Examination Report issued by the Indian Patent Office for corresponding Indian Patent Application No. 202237016239, mailed on on Aug. 1, 2022, with an English translation.

Extended European Search Report with Supplementary European search report and the European search opinion Issued by the European Patent Office for corresponding European Patent Application No. 19946403.3-1213, mailed on Jul. 25, 2022.

International Search Report and Written Opinion of the International Searching Authority issued by the China National Intellectual Property Administration for corresponding International Patent Application No. PCT/CN2019/109151, mailed on Jun. 23, 2020, with an English translation.

Notice of Preliminary Rejection issued by the Korean Intellectual Property Office for corresponding Korean Patent Application No. 10-2022-7010409 mailed on Jun. 12, 2024, with an English translation.

3GPP TS 38.214 V15.7.0, "3rd Generation Partnership Project; Technical Specification Group Radio Access Network; NR; Physical layer procedures for data (Release 15)", Sep. 2019.

* cited by examiner

501 configuration information or indication information is transmitted
to a terminal equipment, the configuration information or indication
information being used for indicating that the terminal equipment
receives at least two versions of a transport block in a scheduling
unit, and the configuration information or indication information
being used by the terminal equipment to determine an association
relationship between a PTRS antenna port and a DMRS antenna
port according to the configuration information, the indication
information or a predefined rule

FIG. 5

TRANSMISSION METHOD AND APPARATUS FOR PHASE TRACKING REFERENCE SIGNAL

CROSS-REFERENCE TO RELATED APPLICATION

This application is a continuation application of International Patent Application PCT/CN2019/109151 filed on Sep. 29, 2019, the entire contents of which are incorporated herein by reference.

TECHNICAL FIELD

This disclosure relates to the field of communication technologies.

BACKGROUND

In a New Radio (NR) system, it is necessary to support some low-latency and high-reliability service scenarios, such as Augmented Reality (AR)/Virtual Reality (VR), factory automation, transportation scenarios including remote driving, and distributed power system control. These services have a latency requirement of 0.5 ms-1 ms and a reliability requirement of 1e-6. Therefore, a fifth-generation (5G) system needs to study transmission technologies with high reliability and low latency to meet requirements of these service scenarios.

In order to improve reliability of transmission, Rel-15 supports repeated transmission of data channels, that is, multiple redundant versions of the same transport block (TB) are repeatedly transmitted in multiple consecutive slots.

In order to continue to further improve reliability of transmission and further reduce transmission delay, Rel-16 enhances repeated transmission of data channels. For example, multiple transmission points (TRPs) are used to transmit identical data for a terminal equipment, thereby increasing reliability of transmission; and for another example, multiple versions of repeated transmissions (also referred to as repeated versions) may be transmitted in one slot, that is, the repeated transmission at a mini-slot level is realized.

In performing transmission by using the multi-TRP technique, multiple TRPs may also perform transmission on the same repeated version by using a beamforming technique. Each TRP pre-codes (weights) data channels by using different beamforming factors, even if quality of a transmission link between one of the TRPs and a terminal equipment is poor and causes failure of signal reception, as long as one repeated version is transmitted correctly, thereby greatly increasing reliability of transmission. In the beamforming technique, the beamforming factors are configured or indicated to the terminal equipment in the form of a transmission configuration indication (TCI), and the terminal equipment may receive signals by selecting an appropriate receive filter, so as to maximize signal transmission quality.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In the repeated transmission of data channels supported by Rel-15, each repeated version is transmitted in a slot, and K repeated versions are scheduled by downlink control information (DCI) signaling, occupying K consecutive slots. The DCI signaling is used to indicate transmission-related parameters of a first slot in K consecutive slots, such as time-domain resource allocation, frequency-domain resource allocation, and a demodulation reference signal (DMRS) antenna port. Also, these transmission-related parameters are also applicable to other K−1 slots, that is, each slot uses identical time-frequency resources and DMRS antenna ports for transmission. Therefore, each slot only needs to transmit one data channel and a corresponding reference signal, such as a DMRS, and a phase tracking reference signal (PTRS).

In Rel-15, each PTRS antenna port is associated with a DMRS antenna port. When the number of PTRS antenna ports is 2, each PTRS antenna port is associated with a DMRS antenna port in a corresponding code-division multiplexing (CDM) group, wherein a first PTRS antenna port is associated with a lowest indexed DMRS antenna port in a CDM group of an allocated first DMRS, and a second PTRS antenna port is associated with a lowest indexed DMRS antenna port in a CDM group of an allocated second DMRS. That is, according to the existing relationship between the PTRS antenna port and the DMRS antenna port, a time-frequency transmission resource of PTRS antenna port is determined by the number of the DMRS antenna port associated with the PTRS antenna port, and a TCI state of the PTRS antenna port is identical to that of the DMRS antenna ports associated with the PTRS antenna port.

However, it was found by the inventors that when multiple repeated versions are transmitted in the same slot, multiple data channels and multiple reference signals, etc., will appear in one slot. In comparison to a case where only one data channel or reference signal is transmitted at one slot, some additional effects need to be taken into account.

For example, when multiple repeated versions (data channels) are transmitted in one slot, if the DMRS transmission method supported by Rel-15 is followed, that is, identical DMRS antenna ports used for transmission at each transmission occasion, the DMRS antenna ports in a slot are all from a code-division multiplexing (CDM) group, and accordingly, only one PTRS antenna port is associated therewith. However, when multiple data channels in a slot come from different TRPs, it is necessary to estimate phase noises of multiple TRPs (i.e. noise sources), thereby requiring PTRS transmitted by multiple antenna ports. That is, the existing association between the PTRS antenna ports and the DMRS antenna ports may cause the number of transmitted PTRS antenna ports to be less than the number of noise sources, so that phase noises in the system cannot be accurately estimated. For another example, if different DMRS antenna ports are used for transmission in each transmission occasion, DMRS antenna ports are allocated for a first transmission occasion via DCI signaling only, and it is still unable to determine time-frequency transmission resources and TCI states of multiple PTRS ports.

In order to solve at least one of the above problems or other similar problems, embodiments of this disclosure provide a transmission method and apparatus for a phase tracking reference signal.

According to a first aspect of the embodiments of this disclosure, there is provided a transmission apparatus for a phase tracking reference signal (PTRS), applicable at a terminal equipment side, the apparatus including: a first receiving unit configured to receive configuration information or indication information transmitted by a network device, the configuration information or indication information being used for indicating that a terminal equipment receives at least two versions of a transport block in a scheduling unit; and a first determining unit configured to determine an association relationship between a PTRS antenna port and a DMRS antenna port according to the configuration information, the indication information or a predefined rule.

According to a second aspect of the embodiments of this disclosure, there is provided a transmission apparatus for a phase tracking reference signal (PTRS), applicable at a terminal equipment side, the apparatus including: a second determining unit configured to determine a TCI state of a PTRS antenna port according to a received TCI state.

According to a third aspect of the embodiments of this disclosure, there is provided a transmission apparatus for a phase tracking reference signal (PTRS), applicable at a terminal equipment side, the apparatus including: a third determining unit configured to determine a time-frequency resource of a PTRS antenna port according to an association relationship between a PTRS antenna port and a DMRS antenna port.

According to a fourth aspect of the embodiments of this disclosure, there is provided a transmission apparatus for a phase tracking reference signal (PTRS), applicable at a network device side, the apparatus including: a first transmitting unit configured to transmit configuration information or indication information to a terminal equipment, the configuration information or indication information being used for indicating that the terminal equipment receives at least two versions of a transport block in a scheduling unit, the configuration information or indication information being used by the terminal equipment to determine an association relationship between a PTRS antenna port and a DMRS antenna port according to the configuration information, the indication information or a predefined rule.

According to a fifth aspect of the embodiments of this disclosure, there is provided a terminal equipment, including the apparatus as described in any one of the first to the fourth aspects of the embodiments of this disclosure.

According to a sixth aspect of the embodiments of this disclosure, there is provided a network device, including the apparatus as described in the fourth aspect of the embodiments of this disclosure.

According to a seventh aspect of the embodiments of this disclosure, there is provided a communication system, including the terminal equipment as described in the fifth aspects of the embodiments of this disclosure and/or the network device as described in the sixth aspect of the embodiments of this disclosure.

According to an eighth aspect of the embodiments of this disclosure, there is provided a transmission method for a phase tracking reference signal (PTRS), applicable at a terminal equipment side, the method including: receiving configuration information or indication information transmitted by a network device, the configuration information or indication information being used for indicating that a terminal equipment receives at least two versions of a transport block in a scheduling unit; and determining an association relationship between a PTRS antenna port and a DMRS antenna port according to the configuration information, the indication information or a predefined rule.

According to a ninth aspect of the embodiments of this disclosure, there is provided a transmission method for a phase tracking reference signal (PTRS), applicable at a terminal equipment side, the method including: determining a TCI state of a PTRS antenna port according to a received TCI state.

According to a ten aspect of the embodiments of this disclosure, there is provided a transmission method for a phase tracking reference signal (PTRS), applicable at a terminal equipment side, the method including: determining a time-frequency resource of a PTRS antenna port according to an association between a PTRS antenna port and a DMRS antenna port.

According to an eleventh aspect of the embodiments of this disclosure, there is provided a transmission method for a phase tracking reference signal (PTRS), applicable at a network device side, the method including: transmitting configuration information or indication information to a terminal equipment, the configuration information or indication information being used for indicating that the terminal equipment receives at least two versions of a transport block in a scheduling unit, the configuration information or indication information being used by the terminal equipment to determine an association relationship between a PTRS antenna port and a DMRS antenna port according to the configuration information, the indication information or a predefined rule.

According to a twelfth aspect of the embodiments of this disclosure, there is provided a computer readable program, which, when executed in a transmission apparatus for a phase tracking reference signal (PTRS) or a terminal equipment, will cause the transmission apparatus for a phase tracking reference signal (PTRS) or the terminal equipment to carry out the transmission method for a phase tracking reference signal (PTRS) as described in any one of the eighth to the tenth aspects of the embodiments of this disclosure.

According to a thirteenth aspect of the embodiments of this disclosure, there is provided a computer storage medium, including a computer readable program, which will cause a transmission apparatus for a phase tracking reference signal (PTRS) or a terminal equipment to carry out the transmission method for a phase tracking reference signal (PTRS) as described in any one of the eighth to the tenth aspects of the embodiments of this disclosure.

According to a fourteenth aspect of the embodiments of this disclosure, there is provided a computer readable program, which, when executed in a transmission apparatus for a phase tracking reference signal (PTRS) or a network device, will cause the transmission apparatus for a phase tracking reference signal (PTRS) or the network device to carry out the transmission method for a phase tracking reference signal (PTRS) as described in the eleventh aspect of the embodiments of this disclosure.

According to a fifteenth aspect of the embodiments of this disclosure, there is provided a computer storage medium, including a computer readable program, which will cause a transmission apparatus for a phase tracking reference signal (PTRS) or a network device to carry out the transmission method for a phase tracking reference signal (PTRS) as described in the eleventh aspect of the embodiments of this disclosure.

An advantage of the embodiments of this disclosure exists in that the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 5 is a schematic diagram of the transmission method for a phase tracking reference signal (PTRS) of Embodiment 3 of this disclosure;

DETAILED DESCRIPTION

Figure 1:
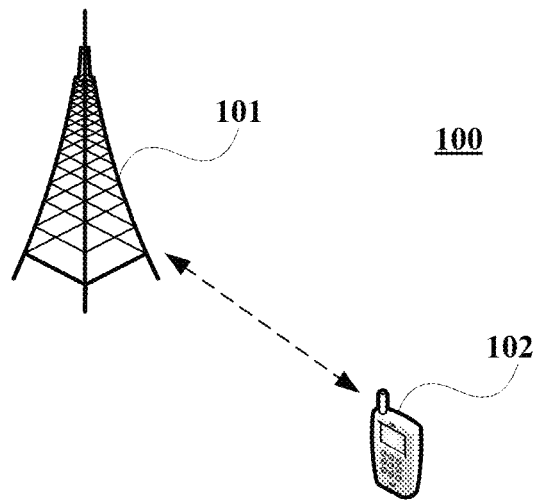
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios of the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, the communication system 100 may include a network device 101 and a terminal equipment 102. For the sake of simplicity, an example having only one terminal equipment is schematically given in FIG. 1. The network device 101 is, for example, a network device gNB of NR, which may include at least one transmission point (TRP).

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

Various implementations of the embodiments of this disclosure shall be described below with reference to the accompanying drawings, and these implementations are illustrative only, and are not intended to limit this disclosure.

Embodiment 1

The embodiment of this disclosure provides a transmission method for a phase tracking reference signal (PTRS), applicable at a terminal equipment side.

Figure 2:
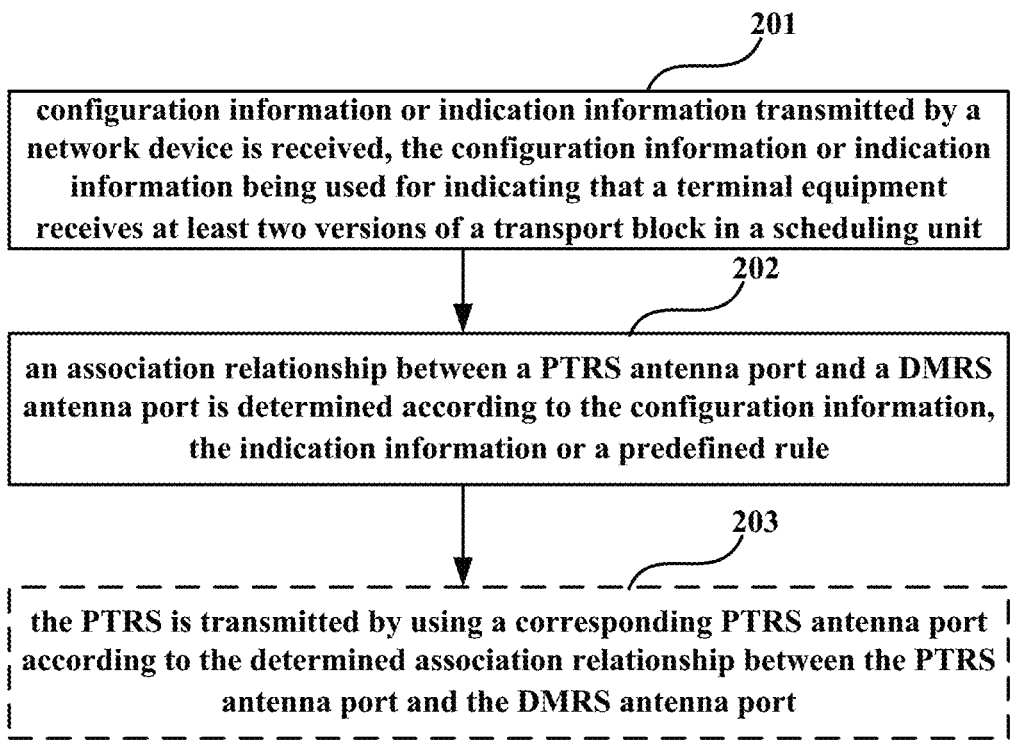
FIG. 2 is a schematic diagram of the transmission method for a phase tracking reference signal (PTRS) of Embodiment 1 of this disclosure.

FIG. 2 is a schematic diagram of the transmission method for a phase tracking reference signal (PTRS) of Embodiment 1 of this disclosure. As shown in FIG. 2, the method includes:

Step 201: configuration information or indication information transmitted by a network device is received, the configuration information or indication information being used for indicating that a terminal equipment receives at least two versions of a transport block in a scheduling unit; and Step 202: an association relationship between a PTRS antenna port and a DMRS antenna port is determined according to the configuration information, the indication information or a predefined rule.

In this way, the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

In this embodiment, the configuration information or the indication information transmitted by the network device is used to instruct the terminal equipment to receive at least two versions of a transport block within one scheduling unit.

In this embodiment, the scheduling unit refers to a time unit for scheduling a terminal equipment to receive data, such as one slot, two or more slots, two or more symbols, etc.

When the network device schedules the terminal equipment to transmit at least two versions of a transport block, the at least two versions are both transmitted in one scheduling unit, and a time unit occupied by each version may also be referred to as a transmission occasion.

In this embodiment, the terminal equipment to receive at least two versions of a transport block within one scheduling unit refers to that at least two versions may be transmitted in one scheduling unit, that is, at least two versions are received by the terminal equipment in one scheduling unit.

In this embodiment, at least two versions of a transport block may be at least two identical versions or different versions of a transport block, that is, at least two versions of a transport block have identical or different redundancy versions (RVs). When it is indicated that the two versions are identical versions, they may also be referred to as repeated versions. Whether the at least two versions are identical is not limited in this disclosure.

In this embodiment, the configuration information or indication information may contain at least one of following pieces of information: a scheduling grant configured by higher-layer signaling (configured grant); the number of times of repeated transmission of a transport block configured by higher-layer signaling; the number of PTRS antenna ports configured by higher-layer signaling; or downlink control information (DCI).

In step 202, the terminal equipment determines the association relationship between the PTRS antenna port and the DMRS antenna port according to the configuration information, the indication information or the predefined rule.

In this embodiment, the terminal equipment may determine the association relationship between the PTRS antenna port and the DMRS antenna port according to information contained in the configuration information or the indication information, or may determine the association relationship according to a pre-defined rule in a protocol.

In this embodiment, "a first one", and "second one", . . . etc., refer to ranking of multiple elements in a certain order, while "first", and "second", . . . etc., are only used to distinguish different elements by names, but does not indicate spatial arrangements or temporal orders of these elements.

For example, a first PTRS antenna port refers to a PTRS antenna port ranking first in 2 PTRS antenna ports, and a second PTRS antenna port refers to a PTRS antenna ranking second in the 2 PTRS antenna ports.

For example, a first DMRS antenna port does not indicate an order or index of the DMRS antenna port in multiple DMRS antenna ports, while a first one of DMRS antenna ports may indicate a DMRS antenna port ranking first in the multiple DMRS antenna ports.

In addition, in this embodiment, a number of an antenna port does not necessarily represent an order of the antenna port in multiple antenna ports.

For example, the multiple DMRS antenna ports are 2 DMRS antenna ports indexed 0 and 1, the first one of DMRS antenna ports refers to a DMRS antenna port indexed 0, and a second one of DMRS antenna ports refers to a DMRS antenna port indexed 1.

For another example, the multiple DMRS antenna ports are two DMRS antenna ports indexed 1 and 3, the first one of DMRS antenna ports refers to a DMRS antenna port indexed 1, and a second one of DMRS antenna ports refers to a DMRS antenna port indexed 3.

In this embodiment, the association relationship may be at least one of the following: association of at least one PTRS antenna port with a DMRS antenna port of a transmission occasion; association of a single PTRS antenna port with a DMRS antenna port indicated by DCI; association of at least one PTRS antenna port with a DMRS antenna port in the scheduling unit; or association of a PTRS antenna port with a DMRS antenna port in a code division multiplexing (CDM) group of a DMRS in the scheduling unit.

In this embodiment, description shall be given by taking that at most two PTRS antenna ports are transmitted within each scheduling unit as an example; however, the embodiment of this disclosure is not limited thereto, and 3 or more PTRS antenna ports may also be transmitted within each scheduling unit.

The association relationship between the PTRS antenna port and the DMRS antenna port of this embodiment shall be illustrated below in detail.

Example 1) For a case where at least one PTRS antenna port is associated with the DMRS antenna port indicated by the DCI, the association relationship may include one of the following:

example 1.1) associating 2 PTRS antenna ports respectively with 2 DMRS antenna ports in the DMRS antenna ports indicated by the DCI;

example 1.2) associating a first one of the PTRS antenna ports with a first DMRS antenna port in the DMRS antenna ports indicated by the DCI, and associating a second one of the PTRS antenna ports with an eighth DMRS antenna port;

example 1.3) associating 2 PTRS antenna ports with a first DMRS antenna port in the DMRS antenna ports indicated by the DCI.

In this embodiment, for the example 1.1, when the number of the indicated PTRS antenna ports is 2 and the number of the DMRS antenna ports indicated by the DCI is 2, for example, the first one of the PTRS antenna ports is associated with a DMRS antenna port with a smallest number in the DMRS antenna ports indicated by the DCI, and the second one of the PTRS antenna ports is associated with a DMRS antenna port with a largest number in the DMRS antenna ports indicated by the DCI; or, the first one of the PTRS antenna ports is associated with a DMRS antenna port ranking first in the DMRS antenna ports indicated by the DCI, and the second one of the PTRS antenna ports is associated with a DMRS antenna port ranking second in the DMRS antenna ports indicated by the DCI.

In this embodiment, as the first one of the PTRS antenna ports and the second one of the PTRS antenna ports are associated with different DMRS antenna ports, there may exist different time-frequency transmission resources.

For the example 1.2, when the number of the indicated PTRS antenna ports is 2 and the number of the DMRS antenna ports indicated by the DCI is 1 or 2, for example, the first one of the PTRS antenna ports is associated with the first DMRS in the DMRS antenna ports indicated by the DCI, and the second one of the PTRS antenna ports is associated with the eighth DMRS antenna port.

For example, the first DMRS antenna port is a DMRS antenna port ranking first in two DMRS antenna ports indicated by the DCI, or a DMRS antenna port ranking second in the two DMRS antenna ports indicated by the DCI, or is a DMRS antenna port indicated by the DCI, or is a DMRS antenna port with a smallest number in more than one DMRS antenna ports indicated by the DCI.

The eighth DMRS antenna port may be a DMRS antenna port performing no transmission within the scheduling unit; for example, the eighth DMRS antenna port is one of the following antenna ports: a predefined antenna port, a second DMRS antenna port in a CDM group different from a CDM group to which the first DMRS antenna port belongs, or a third DMRS antenna port belonging to the same CDM group as the first DMRS antenna port and being indexed differently from the first DMRS antenna port.

In this way, by defining the relationship between the PTRS antenna port and the DMRS antenna port performing no transmission in the scheduling unit, the terminal equipment may be enabled to determine a time-frequency resource occupied by the PTRS transmission, and hence may correctly detect and estimate the PTRS.

For example, a predefined antenna port refers to a predefined DMRS antenna port, which is, for example, one of ports 1000, 1001, 1002, . . . , 1011. For the sake of simplification of the description, in the subsequent description, the numbers of the DMRS antenna ports are briefly referred to as 0, 1, 2, . . . , 11, and so on.

For example, the predefined antenna port is not related to the DMRS antenna port indicated by the DCI, nor is it related to the first DMRS antenna port, that is, no matter which one of the numbers of the DMRS antenna port indicated by the DCI is, or which one of the numbers of the first DMRS antenna port is, the predefined antenna port is fixed.

For example, the second DMRS antenna port refers to a lowest indexed DMRS antenna port in a lowest indexed CDM group different from the CDM group to which the first DMRS antenna port belongs.

For example, the third DMRS antenna port refers to a lowest indexed DMRS antenna port other than the first DMRS antenna port in the CDM group to which the first DMRS antenna port belongs.

For the example 1.3, when the number of the indicated PTRS antenna ports is 2 and the number of the DMRS antenna ports indicated by the DCI is 1 or 2, the 2 PTRS antenna ports are associated with the first DMRS antenna port in the DMRS antenna ports indicated by the DCI, that is, the 2 PTRS antenna ports are associated with the same DMRS antenna port in the DMRS antenna ports indicated by the DCI. Similar to the example in example 1.2, for example, the first DMRS antenna port is a DMRS antenna port ranking first in the two DMRS antenna ports indicated by the DCI, or a DMRS antenna port ranking second in the two DMRS antenna ports indicated by the DCI, or a DMRS antenna port indicated by the DCI.

In this way, the existing mechanism may be followed, so that the PTRS antenna port and the transmitted DMRS antenna port are associated.

In this embodiment, for example, the number of the indicated PTRS antenna ports may be identical to the number of TCI states indicated by a TCI field or other information fields.

Example 2) For association of at least one PTRS antenna port with at least one of a DMRS antenna port of a transmission occasion, a DMRS antenna port within the scheduling unit or a DMRS antenna port in a code-division multiplexing (CDM) group of the DMRS within the scheduling unit, the association relationship may also include one of the following:

example 2.1) associating a first PTRS antenna port with a fourth DMRS antenna port in a first CDM group in CDM groups practically used or scheduled within the scheduling unit, and associating a second PTRS antenna port with a second DMRS antenna port in a second CDM group in the CDM groups practically used or scheduled within the scheduling unit;

example 2.2) associating a first one of PTRS antenna ports with a sixth DMRS antenna port in DMRS antenna ports allocated for a first transmission occasion within the scheduling unit, and associating a second one of PTRS antenna ports with a seventh DMRS antenna port in DMRS antenna ports allocated for a second transmission occasion within the scheduling unit.

For the example 2.1, for example, the first CDM group is a lowest indexed CDM group in CDM groups practically used or scheduled within the scheduling unit, and the second CDM group is a highest indexed CDM group in the CDM groups practically used or scheduled within the scheduling unit the CDM;

for example, the practically used CDM group refers to a CDM group where a DMRS antenna port practically used in transmission in at least one transmission occasion is located, which may be obtained via a DMRS antenna port of a first transmission occasion (i.e. the DMRS antenna port indicated in the DCI) and other parameters or signaling or pre-defined rules, and may also be configured or indicated via other higher-layer parameters or physical layer signaling than an antenna port indication field in the DCI.

For another example, the fourth DMRS antenna port is a lowest indexed DMRS antenna port in the first CDM group, and the fifth DMRS antenna port is a lowest indexed DMRS antenna port in the second CDM group.

For the example 2.2, for example, the first transmission occasion is a transmission occasion being first in timing sequence within the scheduling unit, and the second transmission occasion is a transmission occasion with a TCI state or a DMRS antenna port different from that of the first transmission occasion.

For another example, the sixth DMRS antenna port is a lowest indexed DMRS antenna port in the DMRS antenna ports allocated for the first transmission occasion, that is, a lowest indexed DMRS antenna port in the DMRS antenna ports indicated by the DCI, and the seventh DMRS antenna port is a lowest indexed DMRS antenna port in the DMRS antenna ports allocated for the second transmission occasion.

For example, the first transmission occasion is a transmission occasion being first in timing sequence within the scheduling unit, and the second transmission occasion is a transmission occasion with a TCI state or a DMRS antenna port different from that of the first transmission occasion.

For a case where at least one PTRS antenna port is associated with at least one of the DMRS antenna ports indicated by the DCI, a DMRS antenna port of a transmission occasion, a DMRS antenna port in the scheduling unit or a DMRS antenna port in the code-division multiplexing (CDM) group of the DMRS in the scheduling unit, the association relationship further includes various combinations of the association relationships in the Example 1) and Example 2).

For example, when a PTRS antenna port is configured, an association relationship between the PTRS antenna port and a DMRS antenna port is one of the association relationships mentioned in the Example 1) and Example 2), that is, the DMRS antenna port associated with the PTRS antenna port is one of the following DMRS antenna ports:

a first DMRS antenna port, a second DMRS antenna port, a third DMRS antenna port, a fourth DMRS antenna port, a fifth DMRS antenna port, a sixth DMRS antenna port, a seventh DMRS antenna port, or an eighth DMRS antenna port.

For example, when 2 PTRS antenna ports are configured, a DMRS antenna port associated with a first one of the PTRS antenna ports is one of the following DMRS antenna ports:

a first DMRS antenna port, a second DMRS antenna port, a third DMRS antenna port, a fourth DMRS antenna port, a fifth DMRS antenna port, a sixth DMRS antenna port, a seventh DMRS antenna port, or an eighth DMRS antenna port.

A DMRS antenna port associated with a second one of the PTRS antenna ports is one of the following DMRS antenna ports:

a first DMRS antenna port, a second DMRS antenna port, a third DMRS antenna port, a fourth DMRS antenna port, a fifth DMRS antenna port, a sixth DMRS antenna port, a seventh DMRS antenna port, or an eighth DMRS antenna port.

Method for determining the association relationship between the PTRS antenna port and the DMRS antenna port in step 202 are illustrated above; however, the embodiment of this disclosure is not limited to the exemplified specific methods.

In this embodiment, after the association relationship between the PTRS antenna port and the DMRS antenna port is determined, the method may further include:

Step 203: the PTRS is transmitted by using a corresponding PTRS antenna port according to the determined association relationship between the PTRS antenna port and the DMRS antenna port.

For example, multiple PTRSs are transmitted respectively by using the determined multiple PTRS antenna ports, for use in estimating phase noises of multiple noise sources.

It can be seen from the above embodiment that the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

Embodiment 2

The embodiment of this disclosure provides a transmission method for a phase tracking reference signal (PTRS), applicable at a terminal equipment side.

In the method described in Embodiment 1, in determining the association relationship between the PTRS antenna port and the DMRS antenna port, for some cases, it is necessary to modify transmission behaviors of the PTRS and the associated DMRS antenna port.

For example, for the Example 1.2 in Embodiment 1, transmission behaviors of the PTRS and the associated DMRS antenna port need to be modified. How to modify transmission behaviors shall be described below in detail.

Figure 3:
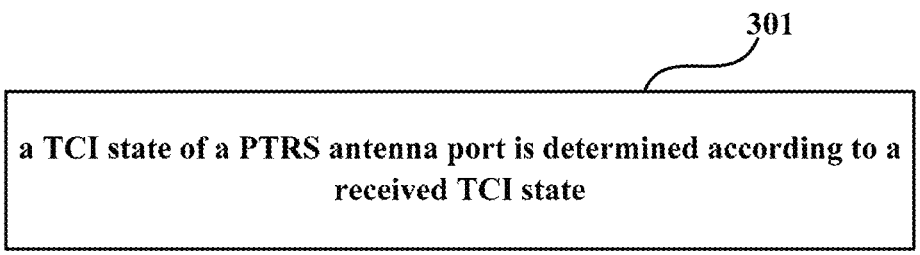
FIG. 3 is a schematic diagram of the transmission method for a phase tracking reference signal (PTRS) of Embodiment 2 of this disclosure.

FIG. 3 is a schematic diagram of the transmission method for a phase tracking reference signal (PTRS) of Embodiment 2 of this disclosure. As shown in FIG. 3, the method includes:

Step 301: a TCI state of a PTRS antenna port is determined according to a received TCI state.

For example, a TCI state of the PTRS antenna port may be determined according to a TCI state indicated by a TCI field or other information fields related to TCI states. For example, a TCI state of a first one of PTRS antenna ports is a first one of TCI states indicated by the TCI field or other information fields related to the TCI states, and a TCI state of a second one of PTRS antenna ports is a second one of the TCI states indicated by the TCI field or other information fields related to the TCI states.

For another example, a TCI state of a first one of 2 PTRS antenna ports may be made identical to a TCI state of a first transmission occasion, and a TCI state of a second one of the PTRS antenna ports may be made identical to a TCI state of a second transmission occasion. For example, the first transmission occasion is a transmission occasion being first in timing sequence within the scheduling unit, and the second transmission occasion is a transmission occasion with a TCI state or a DMRS antenna port different from that of the first transmission occasion.

In this way, although the PTRS antenna port is associated with the untransmitted DMRS antenna port, with this method, the TCI state of the PTRS antenna port may still be determined.

Figure 4:
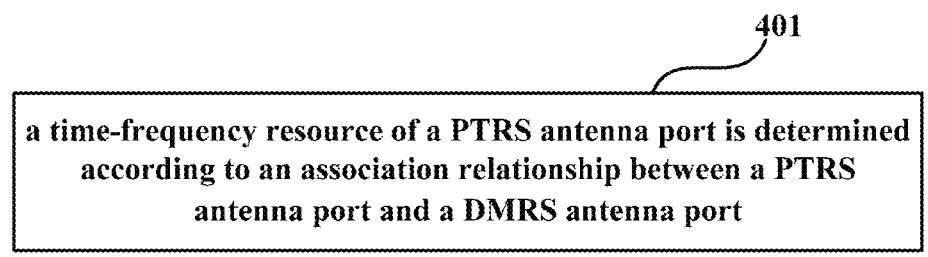
FIG. 4 is another schematic diagram of the transmission method for a phase tracking reference signal (PTRS) of Embodiment 2 of this disclosure.

FIG. 4 is another schematic diagram of the transmission method for a phase tracking reference signal (PTRS) of Embodiment 2 of this disclosure. As shown in FIG. 4, the method includes:

Step 401: a time-frequency resource of a PTRS antenna port is determined according to an association relationship between a PTRS antenna port and a DMRS antenna port.

For example, a time-frequency resource of a first PTRS antenna port is determined by the number of a DMRS antenna port associated with the first PTRS antenna port, and there exists a preset frequency offset or an antenna port offset between a time-frequency resource of a second PTRS antenna port and the time-frequency resource of the first PTRS antenna port.

The frequency offset may be achieved by fixedly increasing or decreasing a preset number of subcarriers in the frequency domain for a first one of 2 PTRS antenna ports, and/or, the antenna port offset may be achieved by setting a DMRS antenna port with which a first one of 2 PTRS antenna ports is associated to be an antenna port obtained by increasing or decreasing a preset number in a PTRS antenna port with which a second one of 2 PTRS antenna ports is associated.

It can be seen from the above embodiment that in determining the association relationship between the PTRS antenna port and the DMRS antenna port, for some cases, by modifying the transmission behaviors of the PTRS antenna port and the DMRS antenna port associated with the PTRS antenna port, it is ensured that different PTRS antenna ports have different time-frequency transmissions resources, hence, phase noises of more than one noise sources may be estimated.

Embodiment 3

The embodiment of this disclosure provides a transmission method for a phase tracking reference signal (PTRS), applicable at a network device side. This method corresponds to Embodiment 1, and reference may be made to Embodiment 1 for particular implementations of this method, with identical contents being not going to be repeated herein any further.

FIG. 5 is a schematic diagram of the transmission method for a phase tracking reference signal (PTRS) of Embodiment 3 of this disclosure. As shown in FIG. 5, the method includes:

Step 501: configuration information or indication information is transmitted to a terminal equipment, the configuration information or indication information being used for indicating that the terminal equipment receives at least two versions of a transport block in a scheduling unit, and the configuration information or indication information being used by the terminal equipment to determine an association relationship between a PTRS antenna port and a DMRS antenna port according to the configuration information, the indication information or a predefined rule.

In this embodiment, the configuration information or indication information may include at least one piece of the following information: a scheduling grant configured by higher-layer signaling; the number of times of transmission of transport blocks configured by higher-layer signaling; the number of PTRS antenna ports configured by higher-layer signaling; or downlink control information (DCI).

In this embodiment, the association relationship may be at least one of the following: association of at least one PTRS antenna port with a DMRS antenna port of a transmission occasion; association of a single PTRS antenna port with a DMRS antenna port indicated by DCI; association of at least one PTRS antenna port with an indicated DMRS antenna port; association of at least one PTRS antenna port with a DMRS antenna port in the scheduling unit; or association of a PTRS antenna port with a DMRS antenna port in a code division multiplexing (CDM) group of a DMRS in the scheduling unit.

For example, the association relationship includes: associating 2 PTRS antenna ports respectively with 2 DMRS antenna ports in DMRS antenna ports indicated by DCI, or, associating a first one of the PTRS antenna ports with a first DMRS antenna port in the DMRS antenna ports indicated by the DCI, and associating a second one of the PTRS antenna ports with an eighth DMRS antenna port, or, associating 2 PTRS antenna ports with a first DMRS antenna port in the DMRS antenna ports indicated by the DCI.

For example, the eighth DMRS antenna port is a DMRS antenna port performing no transmission within the scheduling unit.

For example, the association relationship further includes: associating a first one of PTRS antenna ports with a fourth DMRS antenna port in a first CDM group in CDM groups practically used or scheduled within the scheduling unit, and associating a second one of PTRS antenna ports with a fifth DMRS antenna port in a second CDM group in the CDM groups practically used or scheduled within the scheduling unit.

It can be seen from the above embodiment that the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

Embodiment 4

The embodiment of this disclosure provides a transmission method for a phase tracking reference signal (PTRS), applicable at a terminal equipment side and a network device side. This method corresponds to embodiments 1 and 3, and reference may be made to embodiments 1 and 3 for particular implementations of this method, with identical contents being not going to be repeated herein any further.

Figure 6:
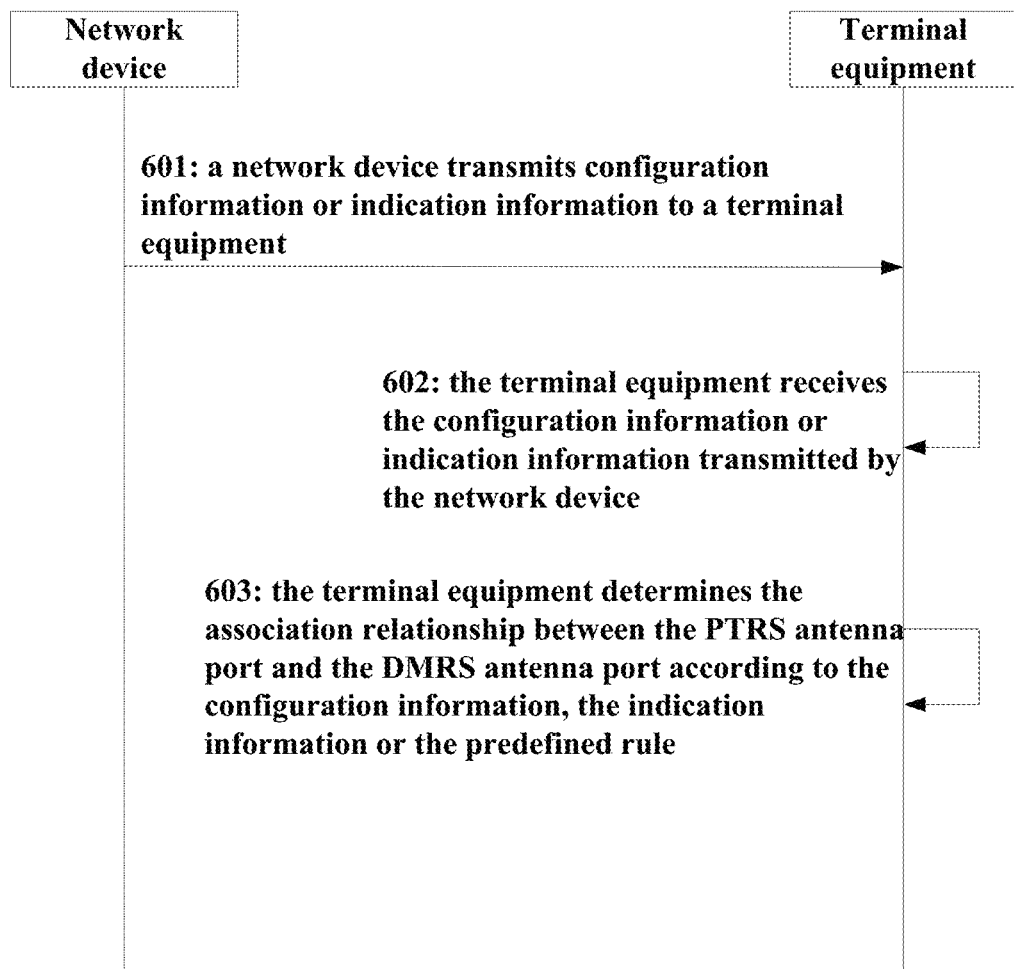
FIG. 6 is a schematic diagram of the transmission method for a phase tracking reference signal (PTRS) of Embodiment 4 of this disclosure.

FIG. 6 is a schematic diagram of the transmission method for a phase tracking reference signal (PTRS) of Embodiment 4 of this disclosure. As shown in FIG. 6, the method includes:

Step 601: a network device transmits configuration information or indication information to a terminal equipment,
the configuration information or the indication information being used to instruct the terminal equipment to receive at least two versions of a transport block in a scheduling unit, and the configuration information or the indication information being used by the terminal equipment determine an association relationship between a PTRS antenna port and a DMRS antenna port according to the configuration information, the indication information or a predefined rule;

Step 602: the terminal equipment receives the configuration information or indication information transmitted by the network device;

Step 603: the terminal equipment determines the association relationship between the PTRS antenna port and the DMRS antenna port according to the configuration information, the indication information or the predefined rule.

In this embodiment, particular implementations of steps 601-603 are identical to those described in Embodiment 1 and Embodiment 3, which shall not be repeated herein any further.

It can be seen from the above embodiment that the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

Embodiment 5

The embodiment of this disclosure provides a method for determining a DMRS antenna port.

The method includes: determining DMRS antenna ports of one or more transmission occasion(s) in a scheduling unit by a terminal equipment according to configuration information or indication information transmitted by a network device.

The configuration or indication information may include at least one piece of the following information:
a transmission occasion scheduling pattern configured by higher-layer signaling;
the number of repetitions of transport blocks configured by the higher-layer signaling; or downlink control information (DCI).

The DCI signaling includes at least one of the following information fields:
a DMRS antenna port indication;
a TCI state indication;
an indication of an antenna port offset between transmission occasions; or
a scheduling pattern-related parameter field related to a DMRS antenna port or a TCI state.

For example, the DCI indicates a DMRS antenna port of a first one of transmission occasions, and the terminal equipment may determine DMRS antenna ports of other transmission occasions according to the DMRS antenna port of the first one of transmission occasions and a predefined antenna port offset or an antenna port offset between transmission occasions indicated by the DCI. For example, the terminal equipment may add a predefined antenna port offset or an antenna port offset between transmission occasions indicated by DCI to the DMRS antenna port of the first one of transmission occasions to obtain the DMRS antenna ports of other transmission occasions.

For another example, when the number of transmission occasions is N, the offset may include N−1 elements, i.e. elements respectively representing a DMRS antenna port offset between a second one of transmission occasions and the first one of transmission occasions, a DMRS antenna port offset between a third one of transmission occasions and the second one of transmission occasions, . . . , and a DMRS antenna port offset between an N-th one of transmission occasions and an (N−1)-th one of transmission occasions, etc.

For a further example, elements of DMRS antenna port offsets between the transmission occasions may be one of −8, −6, −4, −2, 0, 2, 4, 6, or 8. And a range of the elements of the offsets may also be narrowed, such as one of −4, −2, 0, 2 or 4.

For still another example, antenna ports of the first one of transmission occasions indicated by DCI are 0 and 1, and the predefined DMRS antenna port offsets or DMRS antenna port offsets indicated by the DCI are 2 and 0, then the terminal equipment may determine DMRS antenna ports of the second one of transmission occasions are 2 and 3, and DMRS antenna ports of the third one of transmission occasions are 0 and 1.

For yet another example, when the number of transmission occasions is N, the offset may include one element, which is used to indicate an offset between the DMRS antenna port of the first one of transmission occasions and a DMRS antenna port of a transmission occasion using a CDM group or TCI state different from that used by the first one of transmission occasions. And the terminal equipment determines that the DMRS antenna port of the transmission occasion using a CDM group or TCI state identical to that used by the first one of transmission occasions is identical to the DMRS antenna port of the first one of transmission occasions.

For yet still another example, elements of DMRS antenna port offsets between the transmission occasions may be one of −8, −6, −4, −2, 0, 2, 4, 6, or 8. And a range of the elements of the offsets may also be narrowed, such as one of −4, −2, 0, 2 or 4.

For further still another example, CDM groups used by N transmission occasions are determined to be 0, 1 and 0 respectively via the transmission occasion scheduling pattern configured by the higher-layer signaling and/or the scheduling pattern-related parameter field related to the DMRS antenna port or TCI state in the DCI. The antenna ports of the first one of transmission occasions indicated by the DCI are 0 and 1, and the offset of the DMRS antenna port predefined or indicated by the DCI is 2. Therefore, it may be determined that DMRS antenna ports used by the second one of transmission occasions are 2 and 3, and DMRS antenna ports of the third one of transmission occasions are 0 and 1.

In this way, when multiple transmission occasions use different DMRS antenna ports and the DCI signaling only indicates the DMRS antenna port of the first one of transmission occasions, the terminal equipment may also determine the DMRS antenna ports of other transmission occasions according to the information configured or indicated by the network device.

Embodiment 6

The embodiment of this disclosure provides a transmission apparatus for a phase tracking reference signal (PTRS), configured at a terminal equipment side. As a principle of the apparatus for solving problems is similar to that of the method of Embodiment 1, reference may be made to the implementations of the method of Embodiment 1 for implementations of this apparatus, with identical parts being not going to be described herein any further.

Figure 7:
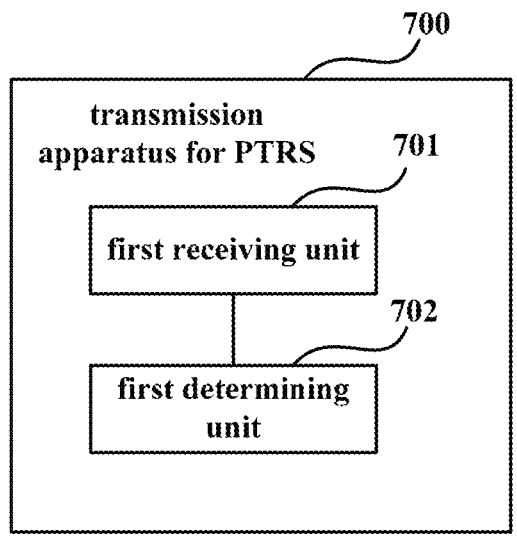
FIG. 7 is a schematic diagram of the transmission apparatus for a phase tracking reference signal (PTRS) of Embodiment 6 of this disclosure.

FIG. 7 is a schematic diagram of the transmission apparatus for a phase tracking reference signal (PTRS) of Embodiment 6 of this disclosure. As shown in FIG. 7, an apparatus 700 includes:
  a first receiving unit 701 configured to receive configuration information or indication information transmitted by a network device, the configuration information or indication information being used for indicating that a terminal equipment receives at least two versions of a transport block in a scheduling unit; and
  a first determining unit 702 configured to determine an association relationship between a PTRS antenna port and a DMRS antenna port according to the configuration information, the indication information or a predefined rule.

In this embodiment, reference may be made to the contents of the steps in Embodiment 1 for implementations of functions of the above unit, which shall not be described herein any further.

It can be seen from the above embodiment that the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

Embodiment 7

The embodiment of this disclosure provides a transmission apparatus for a phase tracking reference signal (PTRS), configured at a terminal equipment side. As a principle of the apparatus for solving problems is similar to that of the method of Embodiment 2, reference may be made to the implementations of the method of Embodiment 2 for implementations of this apparatus, with identical parts being not going to be described herein any further.

Figure 8:
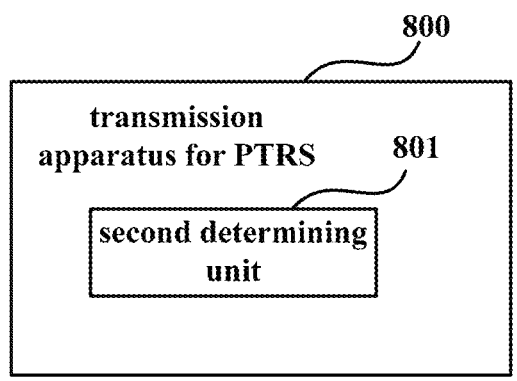
FIG. 8 is a schematic diagram of the transmission apparatus for a phase tracking reference signal (PTRS) of Embodiment 7 of this disclosure.

FIG. 8 is a schematic diagram of the transmission apparatus for a phase tracking reference signal (PTRS) of Embodiment 7 of this disclosure. As shown in FIG. 8, an apparatus 800 includes:
  a second determining unit 801 configured to determine a TCI state of a PTRS antenna port according to a received TCI state.

In this embodiment, reference may be made to Embodiment 2 for a method for determine the TCI state of the PTRS antenna port according to the received TCI state by the second determining unit 801, which shall not be described herein any further.

Figure 9:
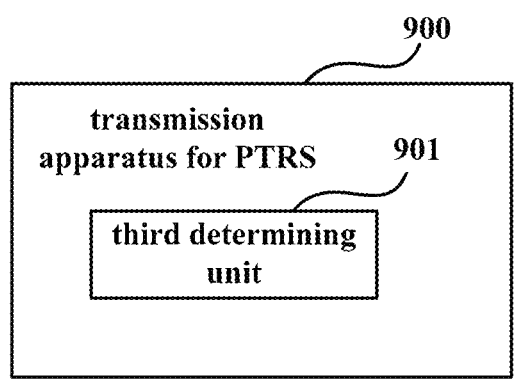
FIG. 9 is another schematic diagram of the transmission apparatus for a phase tracking reference signal (PTRS) of Embodiment 7 of this disclosure.

FIG. 9 is another schematic diagram of the transmission apparatus for a phase tracking reference signal (PTRS) of Embodiment 7 of this disclosure. As shown in FIG. 9, an apparatus 900 includes:
  a third determining unit 901 configured to determine a time-frequency resource of a PTRS antenna port according to an association between a PTRS antenna port and a DMRS antenna port.

In this embodiment, reference may be made to Embodiment 2 for a method for determine the time-frequency resource of the PTRS antenna port according to the association between the PTRS antenna port and the DMRS antenna port by the third determining unit 901, which shall not be described herein any further.

It can be seen from the above embodiment that in determining the association relationship between the PTRS antenna port and the DMRS antenna port, for some cases, by modifying the transmission behaviors of the PTRS antenna port and the DMRS antenna port associated with the PTRS antenna port, it is ensured that different PTRS antenna ports have different time-frequency transmissions resources, hence, phase noises of more than one noise sources may be estimated.

Embodiment 8

The embodiment of this disclosure provides a transmission apparatus for a phase tracking reference signal (PTRS), configured at a network device side. As a principle of the apparatus for solving problems is similar to that of the method of Embodiment 3, reference may be made to the implementations of the method of Embodiment 3 for implementations of this apparatus, with identical parts being not going to be described herein any further.

Figure 10:
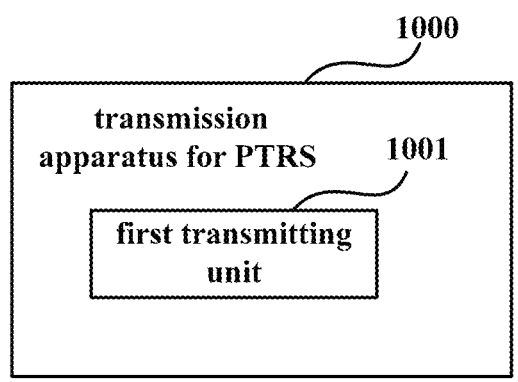
FIG. 10 is a schematic diagram of the transmission apparatus for a phase tracking reference signal (PTRS) of Embodiment 8 of this disclosure.

FIG. 10 is a schematic diagram of the transmission apparatus for a phase tracking reference signal (PTRS) of Embodiment 8 of this disclosure. As shown in FIG. 10, an apparatus 1000 includes:
  a first transmitting unit 1001 configured to transmit configuration information or indication information to a terminal equipment, the configuration information or indication information being used for indicating that the terminal equipment receives at least two versions of a transport block in a scheduling unit, and the configuration information or indication information being used by the terminal equipment to determine an association relationship between a PTRS antenna port and a DMRS antenna port according to the configuration information, the indication information or a predefined rule.

In this embodiment, reference may be made to Embodiment 3 and Embodiment 1 for a method for transmitting the configuration information or indication information by the first transmitting unit 1001 and contents of the configuration information or indication information, which shall not be described herein any further.

It can be seen from the above embodiment that the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

Embodiment 9

The embodiment of this disclosure provides a terminal equipment, including the transmission apparatus for a phase tracking reference signal (PTRS) as described in Embodiment 6 or Embodiment 7.

Figure 11:
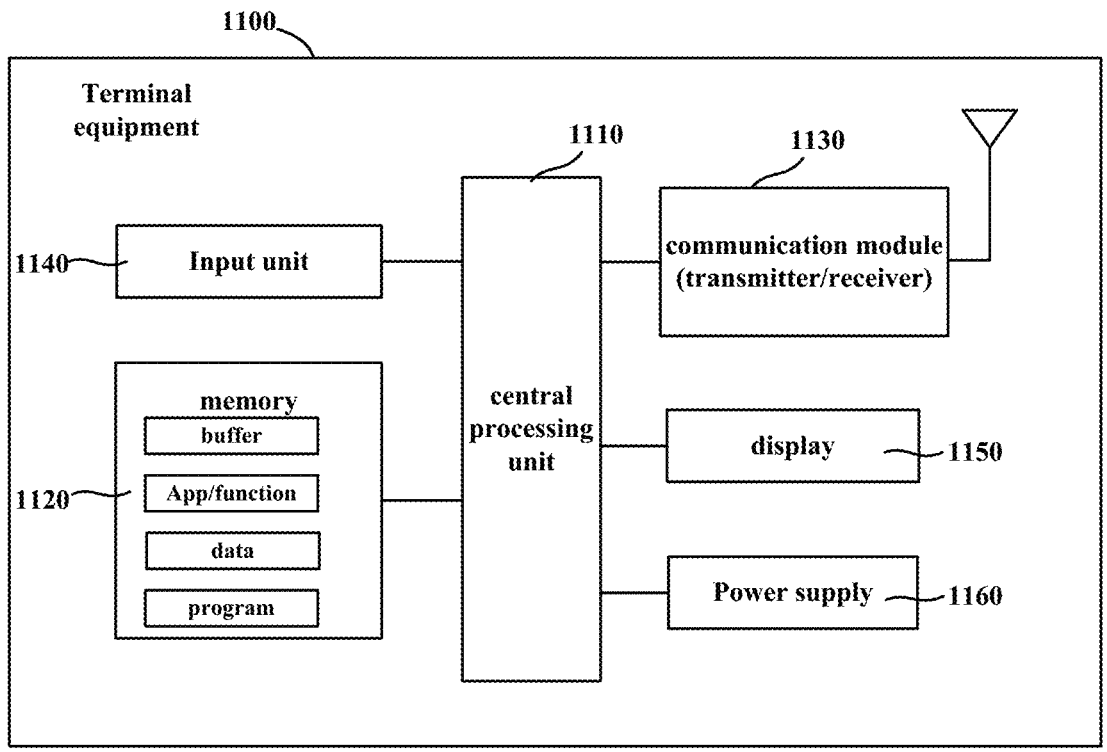
FIG. 11 is a block diagram of the terminal equipment of Embodiment 9 of this disclosure.

FIG. 11 is a schematic diagram of a systematic structure of the terminal equipment of Embodiment 9 of this disclosure. As shown in FIG. 11, a terminal equipment 1100 may include a central processing unit 1110 and a memory 1120, the memory 1120 being coupled to the central processing unit 1110. It should be noted that this figure is illustrative only, and other types of structures may also be used, so as to supplement or replace this structure and achieve a telecommunications function or other functions.

In one implementation, the functions of the transmission apparatus for a phase tracking reference signal (PTRS) may be integrated into the central processing unit 1110. The central processing unit 1110 may be configured to: receive configuration information or indication information transmitted by a network device, the configuration information or indication information being used for indicating that a terminal equipment receives at least two versions of a transport block in a scheduling unit; and determine an association relationship between a PTRS antenna port and a DMRS antenna port according to the configuration information, the indication information or a predefined rule.

Or, the central processing unit 1110 may be configured to: determine a TCI state of a PTRS antenna port according to a received TCI state.

Or, the central processing unit 1110 may be configured to: determine a time-frequency resource of a PTRS antenna port according to an association between a PTRS antenna port and a DMRS antenna port.

In another implementation, the transmission apparatus for a phase tracking reference signal (PTRS) and the central processing unit 1110 may be configured separately; for example, the transmission apparatus for a phase tracking reference signal (PTRS) may be configured as a chip connected to the central processing unit 1110, and the functions of the transmission apparatus for a phase tracking reference signal (PTRS) are executed under control of the central processing unit 1110.

As shown in FIG. 11, the terminal equipment 1100 may further include a communication module 1130, an input unit 1140, a display 1150 and a power supply 1160. It should be noted that the terminal equipment 1100 does not necessarily include all the parts shown in FIG. 11. Furthermore, the terminal equipment 1100 may include parts not shown in FIG. 11, and the related art may be referred to.

As shown in FIG. 11, the central processing unit 1110 is sometimes referred to as a controller or an operational control, which may include a microprocessor or other processor devices and/or logic devices. The central processing unit 1110 receives input and controls operations of components of the terminal equipment 1100.

The memory 1120 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 1110 may execute programs stored in the memory 1120, so as to realize information storage or processing, etc. Functions of other parts are similar to those of the related art, which shall not be described herein any further. The parts of the terminal equipment 1100 may be realized by specific hardware, firmware, software, or any combination thereof, without departing from the scope of this disclosure.

It can be seen from the above embodiment that the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

Embodiment 10

The embodiment of this disclosure provides a network device, including the transmission apparatus for a phase tracking reference signal (PTRS) described in Embodiment 8 of this disclosure.

Figure 12:
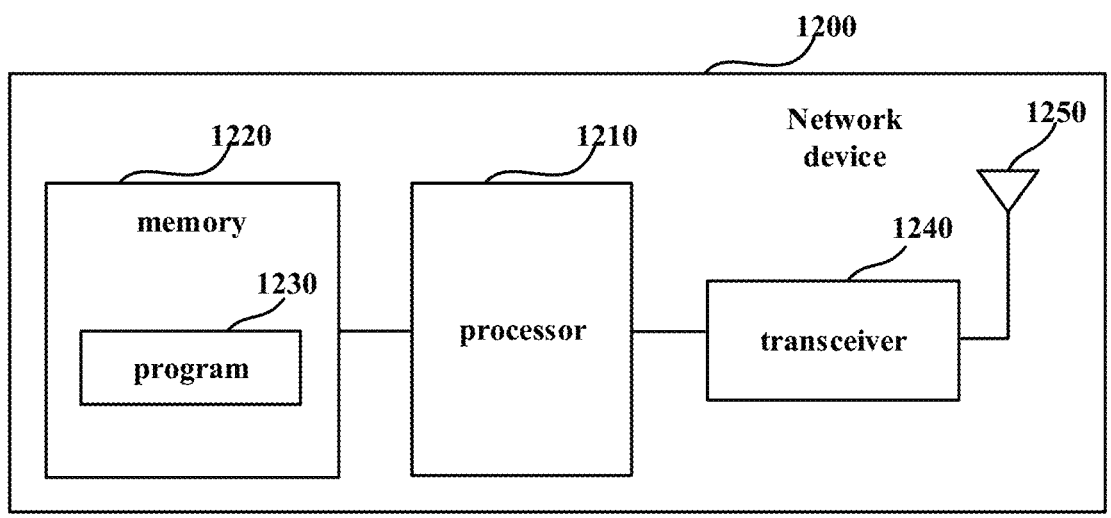
FIG. 12 is a schematic diagram of a structure of the network device of Embodiment 10 of this disclosure.

FIG. 12 is a schematic diagram of a structure of the network device of the embodiment of this disclosure. As shown in FIG. 12, a network device 1200 may include a processor 1210 and a memory 1220, the memory 1220 being coupled to the central processing unit 1210. The memory 1220 may store various data, and furthermore, it may store a program 1230 for data processing, and execute the program 1230 under control of the central processing unit 1210, so as to receive various information transmitted by a terminal equipment, and transmit various information to the terminal equipment.

In one implementation, the functions of the transmission apparatus for a phase tracking reference signal (PTRS) may be integrated into the central processing unit 1210. The central processing unit 1210 may be configured to: transmit configuration information or indication information to a terminal equipment, the configuration information or indication information being used for indicating that the terminal equipment receives at least two versions of a transport block in a scheduling unit, and the configuration information or indication information being used by the terminal equipment to determine an association relationship between a PTRS antenna port and a DMRS antenna port according to the configuration information, the indication information or a predefined rule.

In another implementation, the transmission apparatus for a phase tracking reference signal (PTRS) and the central processing unit 1210 may be configured separately; for example, the transmission apparatus for a phase tracking reference signal (PTRS) may be configured as a chip connected to the central processing unit 1210, and the functions of the transmission apparatus for a phase tracking reference signal (PTRS) are executed under control of the central processing unit 1210.

Furthermore, as shown in FIG. 12, the network device 1200 may include a transceiver 1240, and an antenna 1250, etc. Functions of the above components are similar to those in the related art, and shall not be described herein any further. It should be noted that the network device 1200 does not necessarily include all the parts shown in FIG. 12. Furthermore, the network device 1200 may include parts not shown in FIG. 12, and the related art may be referred to.

It can be seen from the above embodiment that the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

Embodiment 11

The embodiment of this disclosure provides a communication system, including the terminal equipment described in Embodiment 9 and/or the network device described in Embodiment 10.

For example, reference may be made to FIG. 1 for a structure of the communication system. As shown in FIG. 1, the communication system 100 includes a network device 101 and a terminal equipment 102, the terminal equipment 102 being identical to the terminal equipment described in Embodiment 9, and the network device 101 being identical to the network device described in Embodiment 10.

It can be seen from the above embodiment that the terminal equipment determines the association relationship between the PTRS antenna port and the DMRS antenna port according to the configuration information or indication information transmitted by the network device for receiving at least two versions of the transport block in one scheduling unit, or according to a predefined rule. Therefore, each scheduling unit is enabled to support transmission of multiple PTRS antenna ports, and to estimate phase noises of more than one noise sources, thereby ensuring accuracy of phase noise estimation in the system.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 7 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 7 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 7 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

According to the implementations disclosed in the embodiments of this disclosure, following supplements are further disclosed.

1. A transmission apparatus for a phase tracking reference signal (PTRS), applicable at a terminal equipment side, the apparatus including:

a first receiving unit configured to receive configuration information or indication information transmitted by a network device, the configuration information or indication information being used for indicating that a terminal equipment receives at least two versions of a transport block in a scheduling unit; and a first determining unit configured to determine an association relationship between a PTRS antenna port and a DMRS antenna port according to the configuration information, the indication information or a predefined rule.

2. The apparatus according to supplement 1, wherein,
the configuration information or indication information contains at least one of following pieces of information:
a scheduling grant configured by higher-layer signaling (configured grant);
the number of times of repeated transmission of a transport block configured by higher-layer signaling;
the number of PTRS antenna ports configured by higher-layer signaling; or
downlink control information (DCI).

3. The apparatus according to supplement 1 or 2, wherein,
the association relationship is at least one of the following:
association of at least one PTRS antenna port with a DMRS antenna port of a transmission occasion;
association of at least one PTRS antenna port with a DMRS antenna port indicated by DCI;
association of at least one PTRS antenna port with a DMRS antenna port in the scheduling unit; or
association of a PTRS antenna port with a DMRS antenna port in a code division multiplexing (CDM) group of a DMRS in the scheduling unit.

4. The apparatus according to any one of supplements 1-3, wherein,
the association relationship includes:
association of two PTRS antenna ports respectively with two DMRS antenna ports in DMRS antenna ports indicated by DCI, or
association of a first PTRS antenna port with a first DMRS antenna port in DMRS antenna ports indicated by DCI, and association of a second PTRS antenna port with an eighth DMRS antenna port therein, or
association of two PTRS antenna ports with a first DMRS antenna port in DMRS antenna ports indicated by DCI.

5. The apparatus according to supplement 4, wherein the first DMRS antenna port is a DMRS antenna port ranking first in two DMRS antenna ports indicated by DCI, or a DMRS antenna port ranking second in two DMRS antenna ports indicated by DCI, or a DMRS antenna port indicated by DCI, or a lowest indexed DMRS antenna port in DMRS antenna ports indicated by DCI.

6. The apparatus according to supplement 4, wherein the association of two PTRS antenna ports respectively with two DMRS antenna ports in DMRS antenna ports indicated by DCI includes:
association of a first PTRS antenna port with a lowest indexed DMRS antenna port in the DMRS antenna ports indicated by DCI, and association of a second PTRS antenna port with a highest indexed DMRS antenna port in the DMRS antenna ports indicated by DCI, or
association of a first PTRS antenna port with a DMRS antenna port ranking first in the DMRS antenna ports indicated by DCI, and association of a second PTRS antenna port with a DMRS antenna port ranking second in the DMRS antenna ports indicated by DCI.

7. The apparatus according to supplement 4, wherein,
the eighth DMRS antenna port is a DMRS antenna port that is not transmitted in the scheduling unit.

8. The apparatus according to supplement 4 or 7, wherein the eighth DMRS antenna port is one of the following antenna ports:
a predefined antenna port;
a second DMRS antenna port in a CDM group different from a CDM group to which the first DMRS antenna port belongs; or
a third DMRS antenna port belonging to the same CDM group as the first DMRS antenna port and being indexed differently from the first DMRS antenna port.

9. The apparatus according to supplement 8, wherein the second DMRS antenna port refers to:
a lowest indexed DMRS antenna port in a lowest indexed CDM group different from the CDM group to which the first DMRS antenna port belongs.

10. The apparatus according to supplement 8, wherein the third DMRS antenna port refers to:
a lowest indexed DMRS antenna port other than the first DMRS antenna port in the CDM group to which the first DMRS antenna port belongs.

11. The apparatus according to any one of supplements 1-3, wherein,
the association relationship further includes:
association of a first PTRS antenna port with a fourth DMRS antenna port in a first CDM group in CDM groups practically used or scheduled in the scheduling unit, and association of a second PTRS antenna port with a fifth DMRS antenna port in a second CDM group in the CDM groups practically used or scheduled in the scheduling unit.

12. The apparatus according to supplement 11, wherein the first CDM group is a lowest indexed CDM group in the CDM groups practically used or scheduled in the scheduling unit, and the second CDM group is a highest indexed CDM group in the CDM groups practically used or scheduled in the scheduling unit.

13. The apparatus according to supplement 11, wherein the fourth DMRS antenna port is a lowest indexed DMRS antenna port in the first CDM group, and the fifth DMRS antenna port is a lowest indexed DMRS antenna port in the second CDM group.

14. The apparatus according to any one of supplements 1-3, wherein,
the association relationship further includes:
association of a first PTRS antenna port with a sixth DMRS antenna port in DMRS antenna ports allocated for a first transmission occasion in the scheduling unit, and association of a second PTRS antenna port with a seventh DMRS antenna port in DMRS antenna ports allocated for a second transmission occasion in the scheduling unit.

15. The apparatus according to supplement 14, wherein,
the first transmission occasion is a transmission occasion being first in timing sequence within the scheduling unit, and the second transmission occasion is a transmission occasion having a TCI state or a DMRS antenna port different from that of the first transmission occasion.

16. The apparatus according to supplement 14, wherein,
the sixth DMRS antenna port is a lowest indexed DMRS antenna port in the DMRS antenna ports allocated for the first transmission occasion, and the seventh DMRS antenna port is a lowest indexed DMRS antenna port in the DMRS antenna ports allocated for the second transmission occasion.

17. The apparatus according to any one of supplements 1-16, wherein,
the association relationship further includes:
association of a first PTRS antenna port with one of the following DMRS antenna ports:

a first DMRS antenna port, a second DMRS antenna port, a third DMRS antenna port, a fourth DMRS antenna port, a fifth DMRS antenna port, a sixth DMRS antenna port, a seventh DMRS antenna port, or an eighth DMRS antenna port.

18. The apparatus according to any one of supplements 1-16, wherein,
the association relationship further includes:
association of a first one of 2 PTRS antenna ports with one of the following DMRS antenna ports:
a first DMRS antenna port, a second DMRS antenna port, a third DMRS antenna port, a fourth DMRS antenna port, a fifth DMRS antenna port, a sixth DMRS antenna port, a seventh DMRS antenna port, or an eighth DMRS antenna port;
and association of a second one of the 2 PTRS antenna ports with one of the following DMRS antenna ports:
a first DMRS antenna port, a second DMRS antenna port, a third DMRS antenna port, a fourth DMRS antenna port, a fifth DMRS antenna port, a sixth DMRS antenna port, a seventh DMRS antenna port, or an eighth DMRS antenna port.

19. The apparatus according to supplements 1-18, wherein,
the at least two versions are at least two identical or different versions of a transport block.

20. A transmission apparatus for a phase tracking reference signal (PTRS), applicable at a terminal equipment side, the apparatus including:
a second determining unit configured to determine a TCI state of a PTRS antenna port according to a received TCI state.

21. The apparatus according to supplement 20, wherein,
the second determining unit determines the TCI state of the PTRS antenna port according to a TCI state indicated by a TCI field or other information fields related to TCI states.

22. The apparatus according to supplement 21, wherein,
a TCI state of a first one of PTRS antenna ports is a first one of TCI states indicated by the TCI field or other information fields related to the TCI states, and a TCI state of a second one of PTRS antenna ports is a second one of the TCI states indicated by the TCI field or other information fields related to the TCI states.

23. The apparatus according to supplement 20, wherein,
a TCI state of a first one of 2 PTRS antenna ports is identical to a TCI state of a first transmission occasion, and a TCI state of a second one of the PTRS antenna ports is identical to a TCI state of a second transmission occasion.

24. The apparatus according to supplement 23, wherein,
the first transmission occasion is a transmission occasion being first in timing sequence within the scheduling unit, and the second transmission occasion is a transmission occasion with a TCI state or a DMRS antenna port different from that of the first transmission occasion.

25. A transmission apparatus for a phase tracking reference signal (PTRS), applicable at a terminal equipment side, the apparatus including:
a third determining unit configured to determine a time-frequency resource of a PTRS antenna port according to an association between a PTRS antenna port and a DMRS antenna port.

26. The apparatus according to supplement 25, wherein,
a time-frequency resource of a first PTRS antenna port is determined by the number of the DMRS antenna port associated with the first PTRS antenna port, and there exists a preset frequency offset or an antenna port offset between a time-frequency resource of a second PTRS antenna port and the time-frequency resource of the first PTRS antenna port.

27. The apparatus according to supplement 26, wherein,
the frequency offset is achieved by fixedly increasing or decreasing the preset number of subcarriers in the frequency domain for a first one of 2 PTRS antenna ports, and/or,
the antenna port offset is achieved by setting a DMRS antenna port with which a first one of 2 PTRS antenna ports is associated to be an antenna port obtained by increasing or decreasing a preset number in a DMRS antenna port with which a second one of 2 PTRS antenna ports is associated.

28. An apparatus for determining a DMRS antenna port, applicable at a terminal equipment side, the apparatus including:
a fourth determining unit configured to determine DMRS antenna ports of one or more transmission occasion(s) in a scheduling unit according to configuration information or indication information transmitted by a network device.

29. The apparatus according to supplement 28, wherein the configuration or indication information includes at least one piece of the following information:
a transmission occasion scheduling pattern configured by higher-layer signaling;
the number of repetitions of transport blocks configured by the higher-layer signaling; or downlink control information (DCI).

30. The apparatus according to supplement 29, wherein,
the DCI signaling includes at least one of the following information fields:
a DMRS antenna port indication;
a TCI state indication;
an indication of an antenna port offset between transmission occasions; or
a scheduling pattern-related parameter field related to a DMRS antenna port or a TCI state.

31. The apparatus according to any one of supplements 28-30, wherein,
the DCI indicates a DMRS antenna port of a first one of transmission occasions,
and the fourth determining unit determines DMRS antenna ports of other transmission occasions according to the DMRS antenna port of the first one of transmission occasions and a predefined antenna port offset or an antenna port offset between transmission occasions indicated by the DCI.

32. A transmission apparatus for a phase tracking reference signal (PTRS), applicable at a network device side, the apparatus including:
a first transmitting unit configured to transmit configuration information or indication information to a terminal equipment, the configuration information or indication information being used for indicating that the terminal equipment receives at least two versions of a transport block in a scheduling unit,
and the configuration information or indication information being used by the terminal equipment to determine an association relationship between a PTRS antenna port and a DMRS antenna port according to the configuration information, the indication information or a predefined rule.

33. The apparatus according to supplement 32, wherein, the configuration information or indication information contains at least one of following pieces of information:
a scheduling grant configured by higher-layer signaling (configured grant);
the number of times of repeated transmission of a transport block configured by higher-layer signaling;
the number of PTRS antenna ports configured by higher-layer signaling; or
downlink control information (DCI).

34. The apparatus according to supplement 32 or 33, wherein,
the association relationship is at least one of the following:
association of at least one PTRS antenna port with a DMRS antenna port of a transmission occasion;
association of at least one PTRS antenna port with a DMRS antenna port indicated by DCI;
association of at least one PTRS antenna port with an indicated DMRS antenna port;
association of at least one PTRS antenna port with a DMRS antenna port in the scheduling unit; or
association of a PTRS antenna port with a DMRS antenna port in a code division multiplexing (CDM) group of a DMRS in the scheduling unit.

35. The apparatus according to supplement 32 or 33, wherein,
the association relationship includes:
association of two PTRS antenna ports respectively with two DMRS antenna ports in DMRS antenna ports indicated by DCI, or
association of a first PTRS antenna port with a first DMRS antenna port in DMRS antenna ports indicated by DCI, and association of a second PTRS antenna port with an eighth DMRS antenna port therein, or
association of two PTRS antenna ports with a first DMRS antenna port in DMRS antenna ports indicated by DCI.

36. The apparatus according to supplement 35, wherein,
the eighth DMRS antenna port is a DMRS antenna port that is not transmitted in the scheduling unit.

37. The apparatus according to any one of supplements 32-34, wherein,
the association relationship further includes:
association of a first PTRS antenna port with a fourth DMRS antenna port in a first CDM group in CDM groups practically used or scheduled in the scheduling unit, and association of a second PTRS antenna port with a fifth DMRS antenna port in a second CDM group in the CDM groups practically used or scheduled in the scheduling unit.

38. A terminal equipment, including the apparatus as described in any one of supplements 1-31.

39. A network device, including the apparatus as described in any one of supplements 32-37.

40. A communication system, including the terminal equipment as described in supplement 38 and/or the network device as described in supplement 39.

What is claimed is:

1. A transmission apparatus for a phase tracking reference signal (PTRS), applicable at a terminal equipment side, the apparatus comprising:
a first receiver configured to receive configuration information that is carried by a higher layer parameter and that is transmitted by a network device; and
processor circuitry configured to when the terminal equipment is configured by the configuration information that indicates receiving at least two physical downlink shared channel (PDSCH) transmissions of a same transport block in a scheduling unit, determine an association relationship between a PTRS antenna port and a demodulation reference signal (DMRS) antenna port.

2. The apparatus according to claim 1, wherein,
the association relationship comprises:
association of a single PTRS antenna port with a first DMRS antenna port.

3. The apparatus according to claim 2, wherein the first DMRS antenna port is a lowest indexed DMRS antenna port in DMRS antenna ports indicated by DCI.

4. The apparatus according to claim 1, wherein,
the configuration information contains at least one of following pieces of information:
a scheduling grant configured by higher-layer signaling (configured grant);
the number of times of repeated transmission of a transport block configured by higher-layer signaling;
the number of PTRS antenna ports configured by higher-layer signaling; or
downlink control information (DCI).

5. The apparatus according to claim 1, wherein,
the association relationship comprises at least one of the following:
association of at least one PTRS antenna port with a DMRS antenna port of a transmission occasion;
association of a single PTRS antenna port with a DMRS antenna port indicated by DCI;
association of at least one PTRS antenna port with a DMRS antenna port in the scheduling unit; or
association of a PTRS antenna port with a DMRS antenna port in a code division multiplexing (CDM) group of a DMRS in the scheduling unit.

6. The apparatus according to claim 5, wherein,
the association relationship further comprises:
association of two PTRS antenna ports respectively with two DMRS antenna ports in DMRS antenna ports indicated by DCI, or
association of a first one of PTRS antenna ports with a first DMRS antenna port in DMRS antenna ports indicated by DCI, and association of a second one of PTRS antenna ports with an eighth DMRS antenna port therein, or
association of two PTRS antenna ports with a first DMRS antenna port in DMRS antenna ports indicated by DCI.

7. The apparatus according to claim 6, wherein the association of two PTRS antenna ports respectively with two DMRS antenna ports in DMRS antenna ports indicated by DCI comprises:
association of the first one of PTRS antenna ports with a lowest indexed DMRS antenna port in the DMRS antenna ports indicated by DCI, and association of the second one of PTRS antenna ports with a highest indexed DMRS antenna port in the DMRS antenna ports indicated by DCI, or
association of the first one of PTRS antenna ports with a DMRS antenna port ranking first in the DMRS antenna ports indicated by DCI, and association of the second one of PTRS antenna ports with a DMRS antenna port ranking second in the DMRS antenna ports indicated by DCI.

8. The apparatus according to claim 6, wherein,
the eighth DMRS antenna port is a DMRS antenna port that is not transmitted in the scheduling unit.

9. The apparatus according to claim 8, wherein the eighth DMRS antenna port is one of the following antenna ports:
a predefined antenna port;

a second DMRS antenna port in a CDM group different from a CDM group to which the first DMRS antenna port belongs; or a third DMRS antenna port belonging to the same CDM group as the first DMRS antenna port and being indexed differently from the first DMRS antenna port.

10. The apparatus according to claim 9, wherein the second DMRS antenna port refers to:

a lowest indexed DMRS antenna port in a lowest indexed CDM group different from the CDM group to which the first DMRS antenna port belongs.

11. The apparatus according to claim 9, wherein the third DMRS antenna port refers to:

a lowest indexed DMRS antenna port other than the first DMRS antenna port in the CDM group to which the first DMRS antenna port belongs.

12. The apparatus according to claim 5, wherein, the association relationship further comprises:

association of a first one of PTRS antenna ports with a fourth DMRS antenna port in a first CDM group in CDM groups practically used or scheduled in the scheduling unit, and association of a second one of PTRS antenna ports with a fifth DMRS antenna port in a second CDM group in the CDM groups practically used or scheduled in the scheduling unit.

13. The apparatus according to claim 12, wherein the first CDM group is a lowest indexed CDM group in the CDM groups practically used or scheduled in the scheduling unit, and the second CDM group is a highest indexed CDM group in the CDM groups practically used or scheduled in the scheduling unit.

14. The apparatus according to claim 12, wherein the fourth DMRS antenna port is a lowest indexed DMRS antenna port in the first CDM group, and the fifth DMRS antenna port is a lowest indexed DMRS antenna port in the second CDM group.

15. The apparatus according to claim 5, wherein, the association relationship further comprises:

association of a first one of PTRS antenna ports with a sixth DMRS antenna port in DMRS antenna ports allocated for a first transmission occasion in the scheduling unit, and association of a second one of PTRS antenna ports with a seventh DMRS antenna port in DMRS antenna ports allocated for a second transmission occasion in the scheduling unit.

16. The apparatus according to claim 15, wherein, the first transmission occasion is a transmission occasion being first in time sequence within the scheduling unit, and the second transmission occasion is a transmission occasion having a transmission configuration indication (TCI) state or a DMRS antenna port different from that of the first transmission occasion.

17. A transmission apparatus for a phase tracking reference signal (PTRS), applicable at a network device side, the apparatus comprising:

a transmitter configured to transmit, to a terminal equipment configuration information carried by a higher layer parameter, when the terminal equipment is configured by the configuration information that indicates receiving at least two physical downlink shared channel (PDSCH) transmissions of a same transport block in a scheduling unit, an association relationship being determined between a PTRS antenna port and a demodulation reference signal (DMRS) antenna port; and the transmitter being further configured to transmit a PTRS by using a corresponding PTRS antenna port according to the determined association relationship between the PTRS antenna port and the DMRS antenna port.

18. The apparatus according to claim 17, wherein, the association relationship comprises:

association of a single PTRS antenna port with a first DMRS antenna port.

19. The apparatus according to claim 18, wherein the first DMRS antenna port is a lowest indexed DMRS antenna port in DMRS antenna ports indicated by DCI.

* * * * *